(12) United States Patent
Kloss et al.

(10) Patent No.: US 7,837,236 B2
(45) Date of Patent: Nov. 23, 2010

(54) PIPE CONNECTION HAVING A RESHAPED PIPE

(75) Inventors: Alexander Kloss, Köln (DE); Alfons Schorn-Gilson, Swisttal-Odendorf (DE)

(73) Assignee: Eifeler Maschinenbau GmbH, Euskirchen (DE)

( * ) Notice: Subject to any disclaimer, the term of this patent is extended or adjusted under 35 U.S.C. 154(b) by 0 days.

(21) Appl. No.: 11/799,476

(22) Filed: May 1, 2007

(65) Prior Publication Data

US 2007/0267867 A1 Nov. 22, 2007

(30) Foreign Application Priority Data

May 18, 2006 (DE) ................ 10 2006 023 650

(51) Int. Cl.
*F16L 17/00* (2006.01)
(52) U.S. Cl. .................... 285/342; 285/332.1
(58) Field of Classification Search ............ 285/342, 285/382.7, 354, 386, 332.2, 334.1, 332.1
See application file for complete search history.

(56) References Cited

U.S. PATENT DOCUMENTS

| 2,287,889 | A | * | 6/1942 | Ernest et al. | ......... | 285/342 |
| 3,857,591 | A | * | 12/1974 | Voss | ......... | 285/382.7 |
| 5,192,095 | A | * | 3/1993 | Behrens | ......... | 285/332.1 |
| 6,073,976 | A | * | 6/2000 | Schmidt et al. | ......... | 285/382.7 |

FOREIGN PATENT DOCUMENTS

| DE | 74 31 646 U | | 6/1976 |
| DE | 40 34 803 | | 5/1992 |
| DE | 4229502 A1 | * | 5/1994 |
| DE | 197 23 344 | | 12/1998 |
| DE | 103 13 678 | | 6/2004 |
| DE | 10 2005 026 580.4 | | 6/2006 |
| EP | 1462702 | | 3/2004 |
| EP | 1 731 817 | | 12/2006 |
| GB | 2018926 A | * | 10/1979 |
| GB | 2045376 A | * | 10/1980 |
| JP | 06235484 A | * | 8/1994 |

* cited by examiner

*Primary Examiner*—Aaron Dunwoody
(74) *Attorney, Agent, or Firm*—Collard & Roe, P.C.

(57) ABSTRACT

A pipe connection has a aped pipe, a screw fitting body having an internal cone, a union nut, screwable onto the screw fitting body, having an internal clamping face, which, in the operating state of the pipe connection, works together with an outwardly projecting retention face of a retention bulge of the pipe which is produced facing away from the pipe end by reshaping and projects radially outward beyond the outer mantle surface of the pipe, and having an adapter ring which is supported on the side facing toward the screw fitting body by a conical clamping face in the internal cone of the screw fitting body. To provide an alternative pipe connection of this type, the adapter ring may be supported in the operating state on the side facing toward the pipe by a radially running contact face on the radially running front face of the pipe end.

9 Claims, 4 Drawing Sheets

PIPE CONNECTION HAVING A RESHAPED PIPE

CROSS REFERENCE TO RELATED APPLICATIONS

Applicants claims priority under 35 U.S.C. §119 of German Application No. 10 2006 023 650.5 filed May 18, 2006.

BACKGROUND OF THE INVENTION

1. Field of the Invention

The present invention relates to a pipe connection having a reshaped pipe, a screw fitting body having an internal cone, a union nut, which may be screwed onto the screw fitting body, having an internal clamping face, which, in the operating state of the pipe connection, works together with a retention face of a retention bulge of the pipe, which is produced facing away from the pipe end by reshaping and projects outward radially beyond the external mantle surface of the pipe, and having an adapter ring, which is supported on the side facing toward the screw fitting body using a conical clamping face in the internal cone of the screw fitting body, a radially running front face of the pipe having the same cross-section as the remaining pipe outside the retention bulge.

2. Description of the Related Art

A pipe connection of this type is known from German Patent Application 10 2005 026 580.4. A support ring is situated here in such a way that it is supported by diametrically opposite conical faces on one side on the internal cone of the screw fitting body and on the other side on the internal clamping face of the union nut. The support ring simultaneously presses against a retention face of the retention bulge of the pipe and against the mantle surface of the pipe itself, to fix the pipe in the axial direction in this way. The front face of the pipe partially extends radially inward into the cross-section of the through hole of the screw fitting body and reduces the internal diameter of the pipe connection in this area. This pipe connection has the disadvantage that due to the pipe projecting into the internal diameter, eddies are caused in the medium flowing through the pipe, which occur in particular in the event of small internal diameters. The result of this is a high energy loss in the flowing medium. Furthermore, this pipe connection has the disadvantage that the projections into the internal diameter of a pipeline formed by the pipe and the eddies accompanying them cause a large amount of noise to be developed.

Other types of pipe connections are also known from the prior art. A known pipe screw fitting connection is the "flange pipe screw fitting connection ABO 37° " from Eifler Maschinenbau GmbH, Euskirchen, in which the reshaped pipe is not equipped with a bulge, however, but rather is expanded into a tulip flare at one end and is held in its position by an additional support ring. An adapter is interposed between the screw fitting body and the pipe, which is equipped on both sides with conical clamping faces, which are adapted to the internal cone of the screw fitting body or to the internal cone formed by the interior of the conical tulip flare, respectively. The adapter thus forms a transition from the 24° cone of the screw fitting body to the 37° flare connection of the pipe. The adapter also typically projects slightly into the internal cross-section of the pipe connection here, because of which the above-mentioned disadvantages may occur.

Furthermore, a connection system for extremely high-pressure proof pipe screw fitting connections having a standardized 24° screw fitting body is known from DE 40 34 803 A1. The end of the pipe to be connected to the screw fitting body is either flared (FIG. 1 of DE 40 34 803 A1) or provided with a flange connected to the pipe end in one piece, which is equipped in one case (FIG. 2 of DE 40 34 803 A1) with a radial front face and in another case (FIG. 3 of DE 40 34 803 A1) with a front face in the form of a spherical cap. In all cases, however, the free cross-sectional area of the pipe end is expanded radially outward in cross-section in relation to the cross-section of the pipe in the remaining pipe outside the connection area. Therefore, there is sufficient space for a sealing ring which is situated in the area of the front side of the pipe end and is mounted inside the corresponding front side of the adapter ring in a groove.

Furthermore, pipe screw fittings are also known from DE 197 23 344 A1 and DE-GM 74 31 646 U1, in which a cutting ring and/or a clamping ring is used, which works together with the non-deformed external mantle surface of the pipe end. In these known screw fittings, adapter rings are also provided to produce a transition to a screw fitting body. However, with cutting ring and/or clamping ring screw fittings, the danger exists in principle that after they have been loosened once starting from the operating state, they will not fulfill their sealing function properly and reliably again when retightened.

SUMMARY OF THE INVENTION

Object

The object of the present invention is to provide an alternative pipe connection of the type described at the beginning, using which a reshaped pipe is combinable with a screw fitting body having an internal cone.

Achievement Of The Object

Starting from a pipe connection of the type described at the beginning, this object is achieved according to the present invention in that the adapter ring is supported in the operating state on the side facing toward the pipe by a radially running contact face on the radially running front face of the pipe end.

The adapter ring accordingly forms the transition from the screw fitting body having its internal cone to the pipe having its radially implemented front face. The adapter ring may be implemented in such a way that it is exclusively in contact with the screw fitting body and the pipe at the above-mentioned contact faces. When the union nut is screwed together with the screw fitting body, the pipe is moved over the retention bulge in the direction of the screw fitting body until the resistance due to the interposed adapter ring is so great that the components are joined together precisely fitted and the pipe connection is in the operating state. Reaching this state is signaled to the fitter by a large torque increase. Due to the relatively large contact faces of the adapter ring on the screw fitting body and on the pipe, good force distribution is achieved, due to which an extremely stable and robust connection is ensured. During the screwing procedure, the adapter ring ensures that the screw fitting body may rotate in relation to the pipe and the union nut.

It is especially advantageous if the adapter ring has a diameter larger than or identical to the screw fitting body and/or the pipe in the end area. The internal diameter of the pipe connection is thus maintained and/or is not reduced over its entire length, by which the above-mentioned disadvantages are avoided. Accordingly, eddies do not occur as a result of a constriction of the internal diameter.

The adapter ring advantageously has at least one peripheral groove for receiving one sealing ring in each case, preferably a soft seal. The peripheral grooves allow the sealing ring to the house and/or fixed very securely even before the mounting. During the mounting of the pipe connection, the danger that a sealing ring will be displaced unintentionally and may possibly not fulfill its seal function is reduced by the very secure fixing of the sealing ring.

It is advantageous if a groove is located in the conical clamping face of the adapter ring and the opening cross-section of the screw is closed in the operating state of the pipe connection by the internal cone of the screw fitting body.

Furthermore, it is advantageous if a groove for receiving a sealing ring is located in the contact face of the adapter ring and the opening cross-section of this groove is closed in the operating state of the pipe connection by the front side of the pipe.

If grooves for receiving one sealing ring each are situated both in the conical clamping face and also in the contact face of the adapter ring, an optimum seal of the medium located in the internal cross-section is achieved in the area of the pipe connection.

In an especially advantageous embodiment of the present invention, the adapter ring has a guide collar on the side facing toward the pipe end which projects axially beyond this side, whose interior forms a contact face for the mantle surface of the pipe. With the aid of the guide collar engaging on the mantle surface of the pipe, the adapter ring may be centered especially securely and precisely during the mounting of the pipe connection. Flaws may thus be avoided, such as those in which the adapter ring projects into an area in the internal area of the pipe connection while it is positioned outward in the diametrically opposite area, viewed radially.

Centering of the adapter ring by the guide collar is very advantageous for small pipe diameters in particular, because in this case eccentricities having comparatively small absolute values may already result in problems. This is the case in particular if a sealing ring is situated in the front side of the adapter ring which works together with the front side of the pipe end. In pipe connections of this type, the danger also exists that incorrect mounting having eccentric positioning, in which the sealing ring does not press against the entire area of the assigned front face of the pipe end, will not be noted by the fitter at all, because the sealing ring is not externally visible in the joined state or in the operating state.

If there is an eccentricity of the longitudinal axes of the screw fitting body or the union nut because of manufacturing tolerances which are too large, in a pipe connection without a guide collar on the adapter ring, the mounting will possibly be performed normally with the result that in the operating state, there would be a corresponding offset of the front faces and the sealing function would possibly not be ensured. If a guide collar is provided on the adapter ring, mounting is not possible at all in the event of large eccentricity of screw fitting body and union nut, because an offset in the area of the front faces of pipe and adapter ring is impossible and therefore the torque required by the fitter when tightening the connection would already rise drastically at a very early time and would thus indicate to him the flawed nature of the parts used. A flawed operating state having possible leakiness of the connection may thus not be achieved at all.

Furthermore, in an advantageous embodiment of the present invention, the adapter ring has a slightly smaller external diameter than the internal diameter of the union nut. It is thus ensured that the adapter ring is exclusively in contact with the screw fitting body and the pipe, which is advantageous during the mounting of the pipe connection in particular, because frictional forces are not transmitted from the union nut to the adapter ring as the union nut and screw fitting body are screwed together.

It is especially advantageous if the guide collar has a lug projecting radially inward, because the position of the adapter ring on the pipe may thus be further optimized.

A clamping effect, which holds the adapter ring previously plugged onto the pipe in its position, is achieved if the internal diameter of the adapter ring in the area of the lug is less than the external diameter of the pipe in the end area. The mounting of the pipe screw fitting is thus significantly simplified, because the pipe having the adapter ring plugged thereon may be handled as a unit. The mounting is made easier especially in the event of mounting overhead.

Finally, it is advantageous if the adapter ring has a rubber coating in the area of the lug, which generates a certain adhesion of the adapter ring on the pipe, which also provides a mounting aid.

Exemplary Embodiment

The present invention is explained in greater detail in the following on the basis of multiple exemplary embodiments of a pipe connection which are shown in the drawing.

DETAILED DESCRIPTION OF PREFERRED EMBODIMENTS

Figure 1:
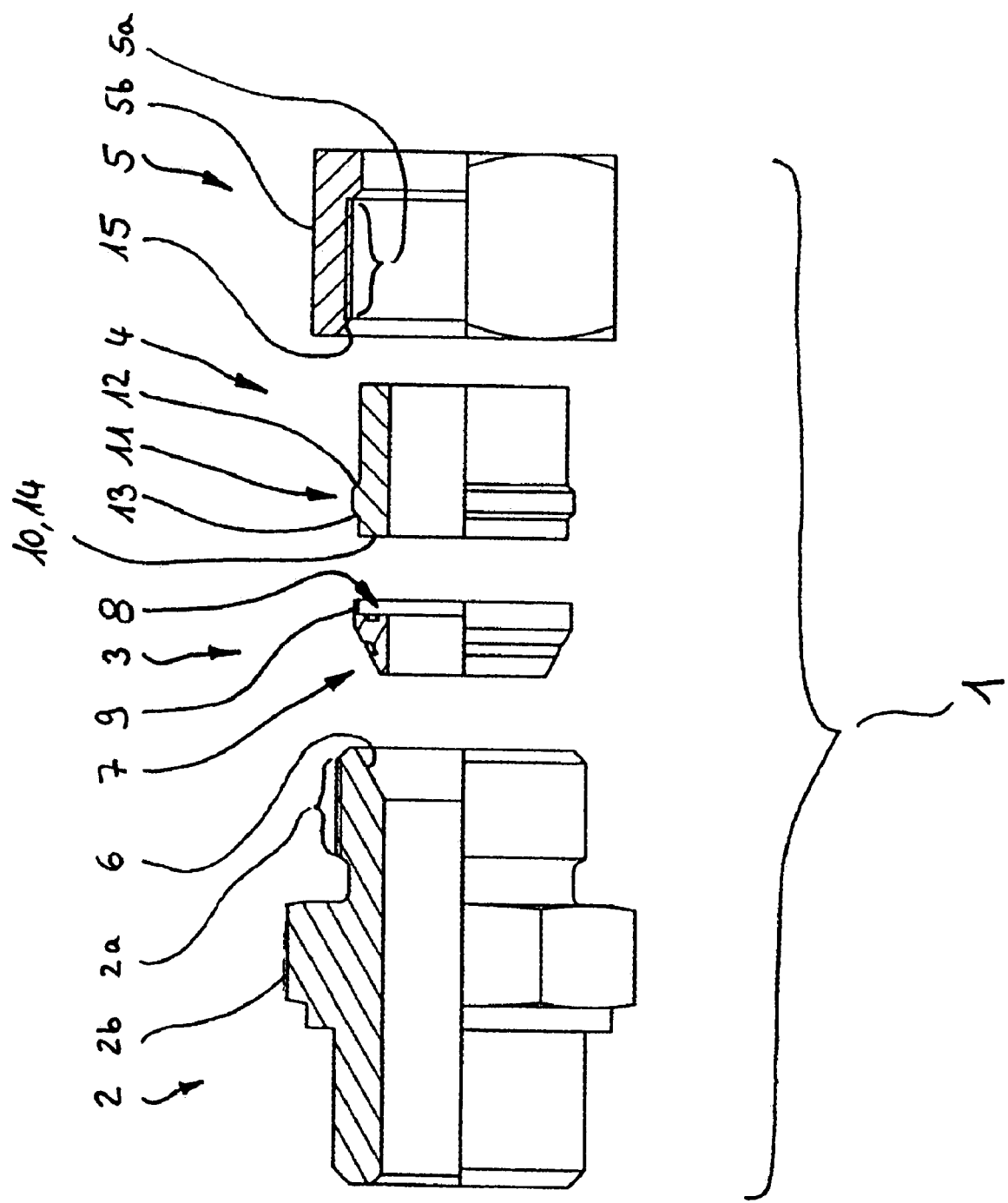
FIG. 1 shows an arrayed illustration of a screw fitting body, an adapter ring, a reshaped pipe end, and a union nut, each in half section.

FIG. 1 shows a pipe connection 1 according to the present invention, in which the individual components are shown arrayed neighboring one another for the sake of clarity. Starting from the central axis of the components, the upper halves of the components are each shown in section, while the lower halves are each shown as a view of the components. The pipe connection 1 comprises a screw fitting body 2 having an external threaded section 2a, an adapter ring 3, a pipe 4, of which only a short end section is shown, and a union nut 5 having an internal threaded section 5a, which is compatible with the external threaded section 2a of the screw fitting body 2. On the side facing toward the adapter ring 3, the screw fitting body 2 has a 60 ° internal cone 6. Furthermore, the screw fitting body 2 is equipped with a hexagon 2b and the union nut 5 is equipped with a hexagon 5b for the use of a hexagon key.

The adapter ring 3 has a conical clamping face 7 forming a 60° cone on the side facing toward the screw fitting body 2, which is compatible with the 60° internal cone 6 of the screw fitting body 2. On the side facing toward the pipe 4, the adapter ring 3 has a flat contact face 8 running in the radial direction. Furthermore, the adapter ring 3 is equipped around its circumference with a guide collar 9 forming a projection in the axial direction of the adapter ring 3. The adapter ring 3 is described in more detail on the basis of FIGS. 2 through 3a.

At a certain distance from its front side 10, the pipe 4 has a retention bulge 11, shaped using a compression procedure in a special tool, which has a rear retention face 12, facing away from the front side 10 of the pipe 4 in the form of a 90° cone, and a diametrically opposite front retention face 13, which is also designed as conical. The pipe end has a cylindrical end section having a flat front face 14, its internal diameter corresponding to the internal diameter of the pipe 4 in the non-deformed area. The cross-sectional area of the pipe in the non-deformed area corresponds to the cross-section of the front face 14.

The union nut 5 has an internal clamping face 15 which forms a 90° cone on its side pointing toward the pipe 4.

Figure 2:
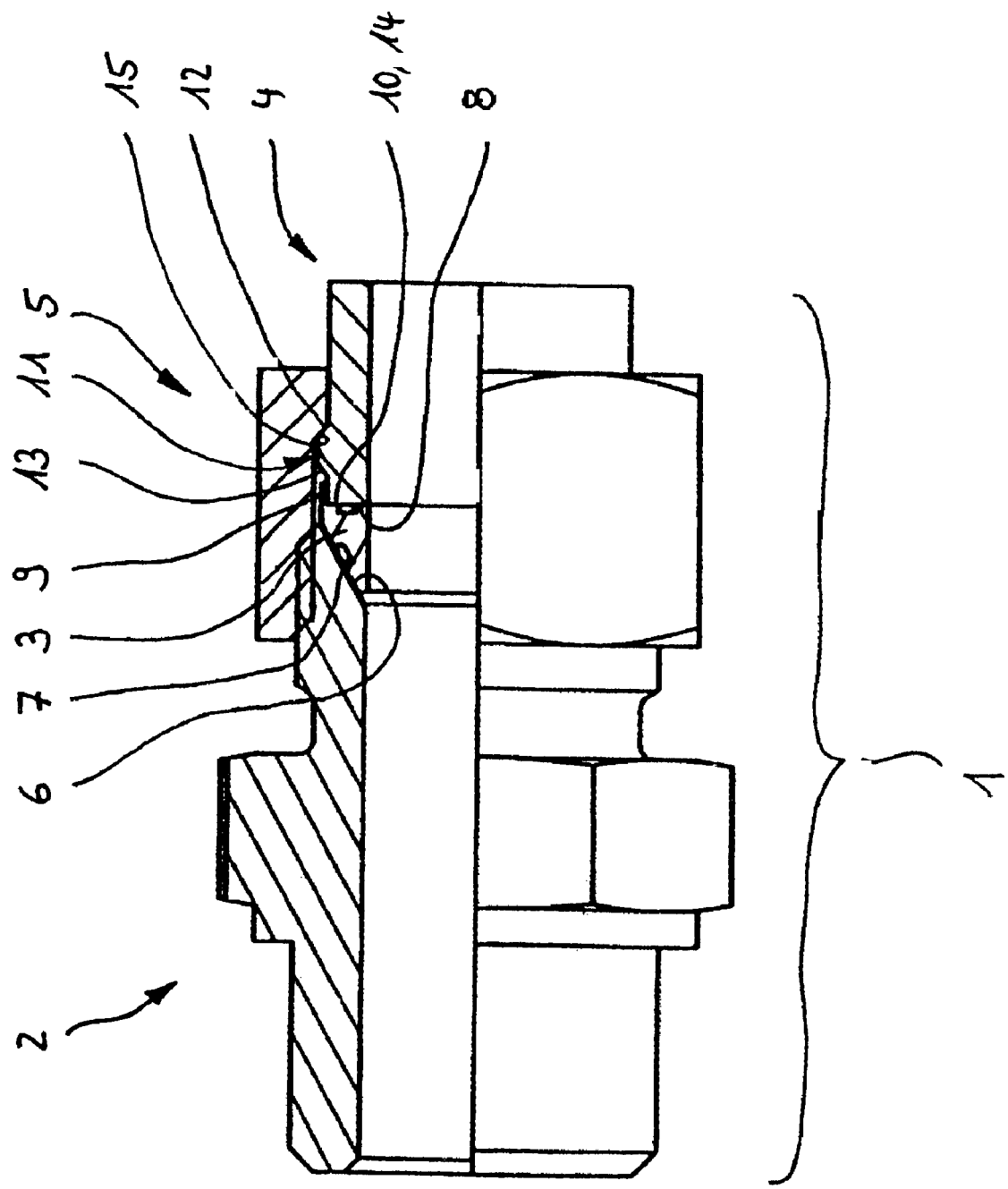
FIG. 2 shows a pipe connection made of the components from FIG. 1 in the operating state in half section.

The pipe connection 1 is shown in its operating state in FIG. 2. By screwing together the union nut 5 with the screw fitting body 2, the components of the pipe connection 1 are joined in such a way that the 60° internal cone 6 of the screw fitting body 2 works together with the conical clamping face 7 of the adapter ring 3, the flat contact face 8 running in the radial direction works together with the front face 14 of the pipe 4, and the rear retention face 12 of the retention bulge 11 facing away from the front side 10 of the pipe 4 works together with the internal clamping face 15 of the union nut 5. The adapter ring 3 accordingly only presses against the screw fitting body 2 and the pipe 4, the conical clamping face 7 of the adapter ring 3 pressing against the internal cone 6 of the screw fitting body 2 over its entire length and, in addition, the entire front face 14 of the pipe 4 pressing against the contact face 8 of the adapter ring 3. The peripheral guide collar 9 of the adapter ring 3 has an internal diameter which approximately corresponds to the external diameter of the cylindrical pipe end, so that the mantle surface 16 of the pipe 4 presses against the interior 17 of the guide collar 9, as may be seen well in FIG. 3. The pipe end is embedded in a formfitting way in the angled area of the adapter ring 3, formed by the contact face 8 and the guide collar 9 of the adapter ring 3. It is thus ensured during the mounting of the pipe connection 1 that the components are properly joined together. Furthermore, the geometry of the adapter ring 3 ensures that no torque is introduced therein during the mounting of the pipe connection 1, so that the adapter ring 3 is stationary during the mounting, because of which the screwing procedure is not impaired. The internal diameter of the adapter ring 3 corresponds to the internal diameter of the screw fitting body 2 and the pipe 4, by which it is ensured that the internal diameter within the pipe connection 1 is maintained over its entire length, because of which eddies in a medium flowing through are avoided.

The detail enlargement of FIG. 2 in the area of the adapter ring 3 illustrated in FIG. 2a once again illustrates the position of the adapter ring 3 between the screw fitting body 2 and the pipe 4. The retention bulge 11 of the pipe 4 has a greater thickness than the wall thickness of the guide collar 9 of the adapter ring 3, because of which a clearance remains between the adapter ring 3 and the union nut 5. I.e., the guide collar 9 has a smaller external diameter than the retention bulge 11 of the pipe 4. The front retention face 13 of the retention bulge 11 is exposed and is not in contact with any of the other components. The conical clamping face 7 and the flat contact face 8 of the adapter ring 3 are each equipped in their central area with a peripheral groove 18, 19 for receiving a sealing ring 20, 21 implemented as a soft seal. The opening cross-section of these grooves 18, 19 is closed in the operating state by the internal cone 6 of the screw fitting body 2 or by the front face 14 of the pipe 4, respectively.

Figure 2A:
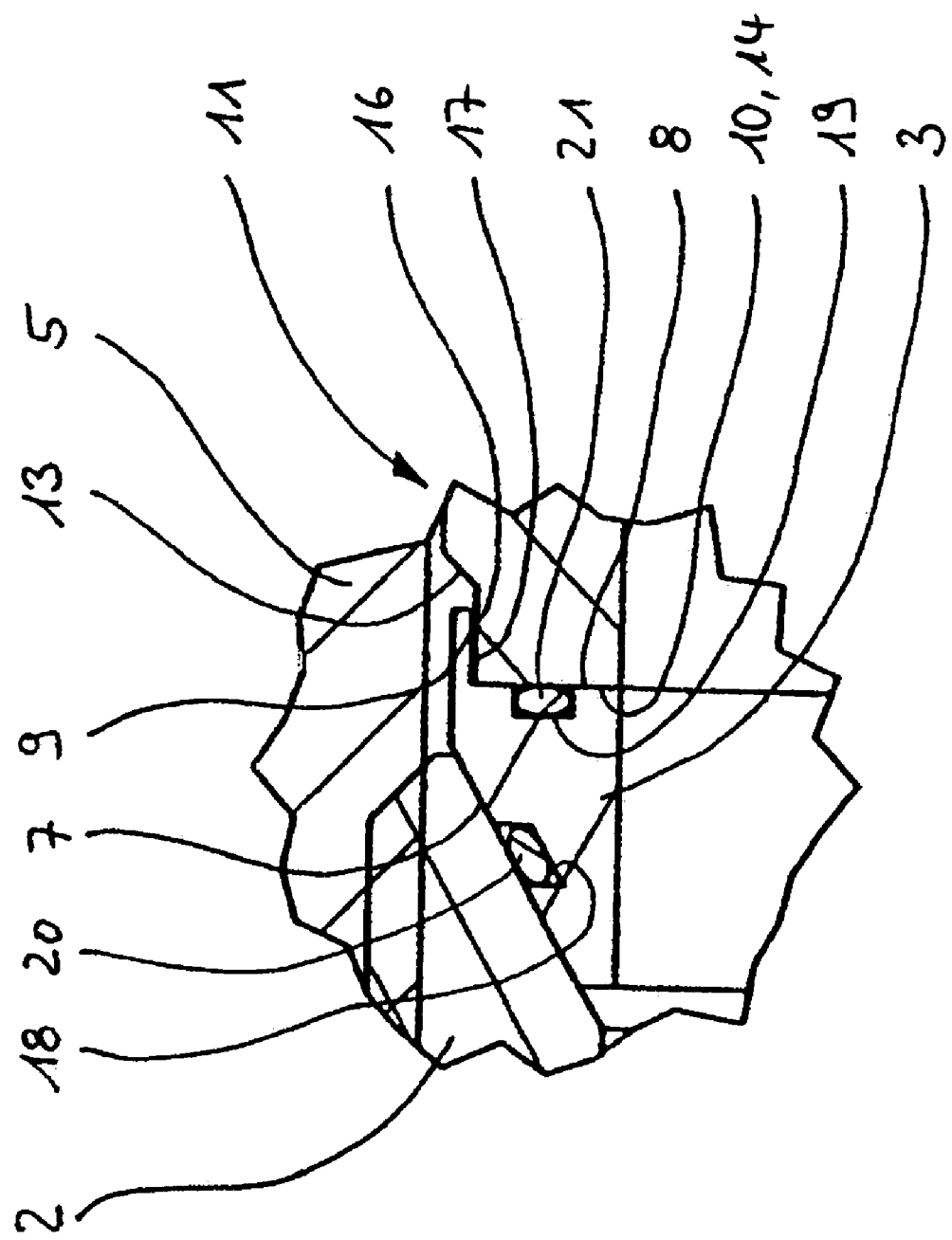
FIG. 2a shows a detail enlargement of FIG. 2 in the area of the adapter ring.
Figure 3A:
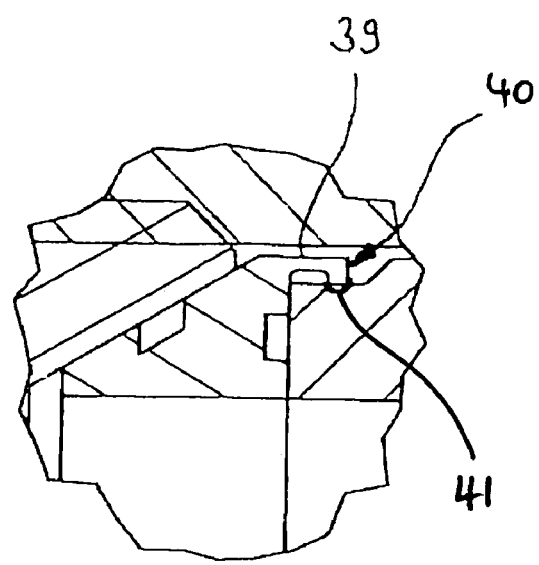
FIG. 3a is like FIG. 2a, but with an alternatively shaped adapter ring.
Figure 3:
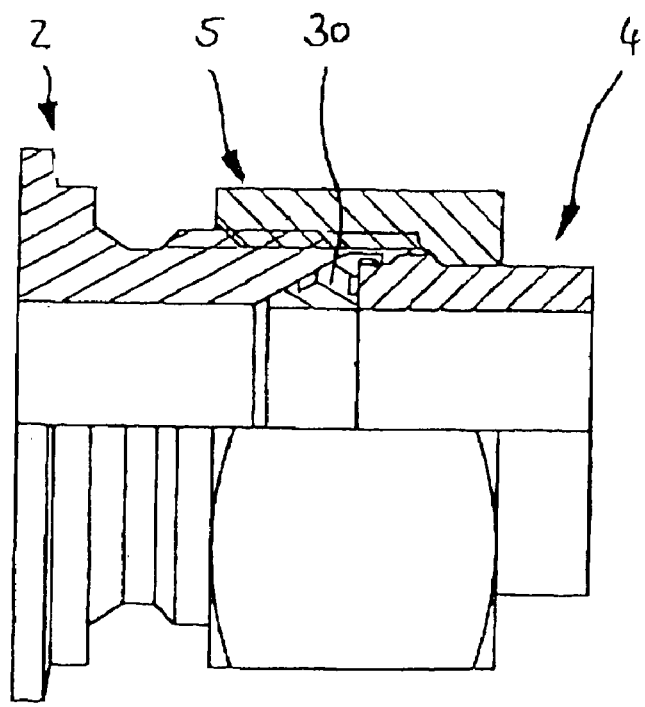
FIG. 3 is like FIG. 2, but with partial illustration of the screw fitting body and having an alternatively shaped adapter ring.

FIGS. 3 and 3a show a pipe screw fitting 1 analogous to FIGS. 2 and 2a, but the adapter ring 30 is shaped alternatively and only the end area of the screw fitting body 2 is illustrated in FIG. 3. The difference of the adapter ring 30 to the embodiment in FIGS. 2 and 2a comprises the implementation of the guide collar 39, which is additionally equipped with a lug 40 pointing radially inward. The internal diameter of the adapter ring 30 in the area of the lug 40 is less than the external diameter of the pipe 4 in the end area. If the adapter ring 30 is plugged onto the pipe 4, clamping forces arise which hold the adapter ring 30 in position on the pipe 4, so that the mounting of the pipe screw fitting 1 is significantly simplified. The pipe 4 having the adapter ring 30 attached thereto may be handled as a unit, by which mounting overhead is made easier, for example. The adhesion of the adapter ring 30 to the pipe end may also be improved by applying a rubber coating 41 to the lug 40.

For the sake of better visibility, showing the sealing rings in the grooves has been dispensed with in FIGS. 3 and 3a.

LIST OF REFERENCE SIGNS 1 pipe connection
2 screw fitting body
2a external threaded section
2b hexagon
3 adapter ring
4 pipe
5 union nut
5a internal threaded section
5b hexagon
6 internal cone
7 conical clamping face
8 contact face
9 guide collar
10 front face
11 retention bulge
12 rear retention face
13 front retention face
14 front face
15 internal clamping face
16 mantle surface
17 interior
18 peripheral groove
19 peripheral groove
20 sealing ring
21 sealing ring
30 adapter ring
39 guide collar
40 lug
41 rubber coating

The invention claimed is:

1. A pipe connection (1) comprising:
a reshaped pipe (4) having a retention bulge (11) produced facing away from an end of the pipe by reshaping and projecting radially outward beyond an outer mantle surface of the pipe,
a screw fitting body (2) having a 60° internal cone (6),
a one-piece union nut (5), adapted to be screwed onto the screw fitting body (2), the one-piece union nut having an internal clamping face (15), which, in an operating state of the pipe connection (1), works together with an outwardly projecting retention face (12) of the retention bulge (11), and
a one-piece adapter ring (3, 30) supported on a side facing toward the screw fitting body (2) by a conical clamping face (7) in the 60° internal cone (6) of the screw fitting body (2), the one-piece adaptor ring having a radially running contact face (8) on a side facing toward the pipe and a peripheral guide collar on the side facing toward the pipe end, the peripheral guide collar projecting beyond this side, wherein the peripheral guide collar comprises a lug pointing radially inward and an interior forming a contact face for the mantle surface of the pipe wherein a radially running front face (14) at a terminal end of the pipe has a same cross-section as a remaining portion of the pipe (4) outside the retention bulge (11), wherein facing toward the one-piece adapter ring (3, 30) the screw fitting body (2) has a solely conical butting surface formed by one single inclined surface extending to an inner cylindrical jacket of the screw fitting body and forming the 60° internal cone (6), the solely conical butting surface forming an only surface of the screw fitting body contacting the one-piece adapter ring in the operating state, and wherein the one-piece adapter ring (3, 30) is supported in the operating state on the side facing toward the pipe (4) by the radially running contact face (8) which contacts the radially running front face (14) at the terminal end of the pipe.

2. The pipe connection (1) according to claim 1, wherein the one-piece adapter ring (3, 30) has an internal diameter larger than or identical to at least one of the screw fitting body (2) and the pipe (4) in the end area.

3. The pipe connection (1) according to claim 1, wherein the one-piece adapter ring (3, 30) has at least one peripheral groove (18, 19) for receiving a sealing ring (20, 21).

4. The pipe connection (1) according to claim 3, wherein the at least one peripheral groove (18) is located in the conical clamping face (7) of the one-piece adapter ring (3, 30) and an opening cross-section of the at least one peripheral groove (18) is closed in the operating state of the pipe connection (1) by the 60° internal cone (6) of the screw fitting body (2).

5. The pipe connection (1) according to claim 3, wherein the at least one peripheral groove (19) is located in the contact face (8) of the one-piece adapter ring (3, 30) and an opening cross-section of the at least one peripheral groove (19) is closed in the operating state of the pipe connection (1) by a front side (10) of the pipe (4).

6. The pipe connection (1) according to claim 1, wherein the one-piece adapter ring (3, 30) has a slightly smaller external diameter than an internal diameter of the one-piece union nut (5).

7. The pipe connection (1) according to claim 1, wherein an internal diameter of the one-piece adapter ring (30) is smaller in an area of the lug (40) than an external diameter of the pipe (4) in the end area.

8. The pipe connection (1) according to claim 1, wherein the one-piece adapter ring (30) has a rubber coating in an area of the lug (40).

9. The pipe connection according to claim 1, wherein the one-piece union nut and the one-piece adapter ring are made from a metal.

* * * * *